W. G. HAY.
APPARATUS EMPLOYED IN THE REMOVAL OF DUST AND THE LIKE.
APPLICATION FILED JUNE 13, 1914.
1,127,242. Patented Feb. 2, 1915.
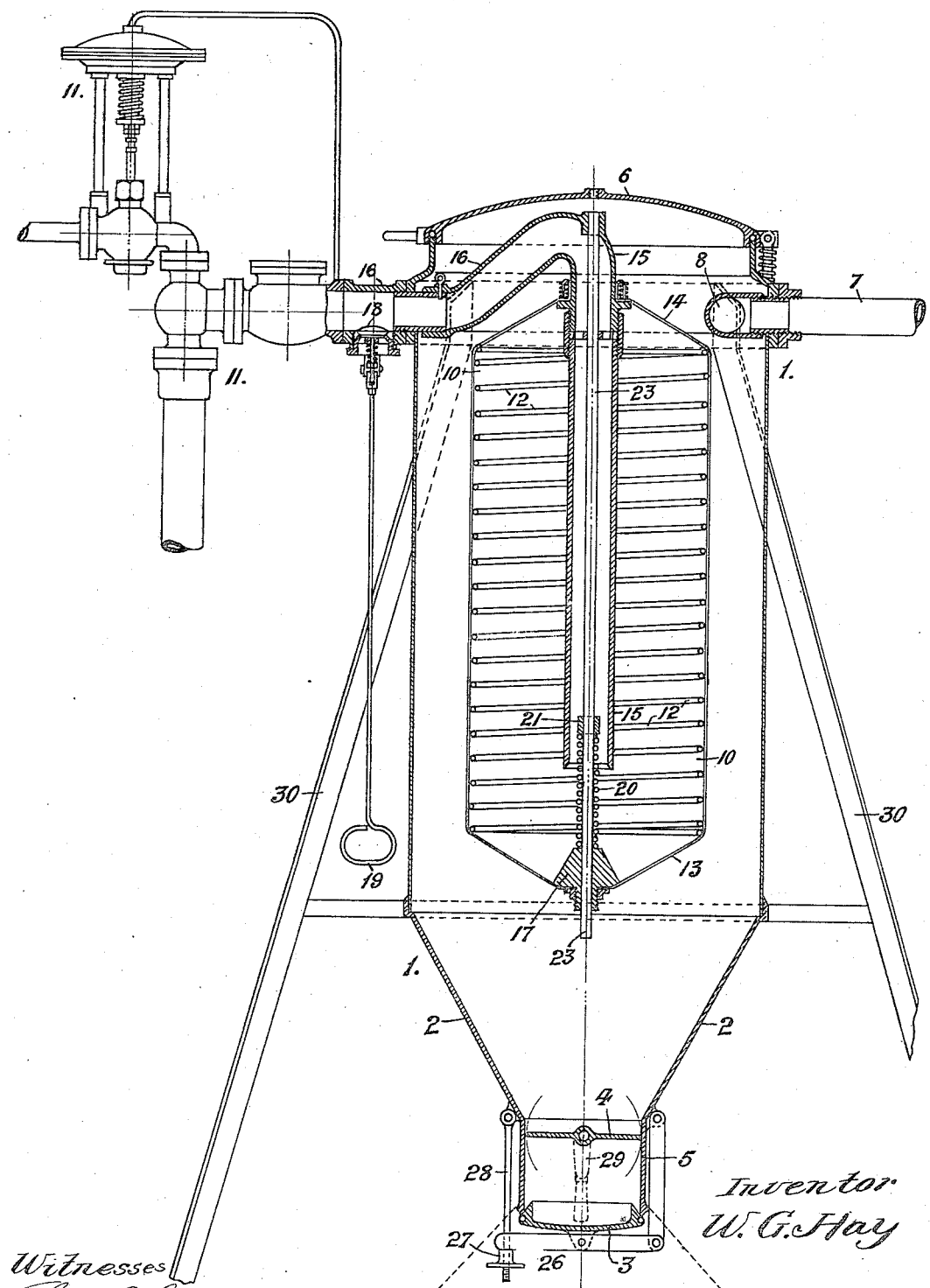

UNITED STATES PATENT OFFICE.

WILLIAM GEORGE HAY, OF PRESTWICH, ENGLAND.

APPARATUS EMPLOYED IN THE REMOVAL OF DUST AND THE LIKE.

1,127,242.      Specification of Letters Patent.      Patented Feb. 2, 1915.

Application filed June 13, 1914. Serial No. 845,006.

*To all whom it may concern:*

Be it known, that I, WILLIAM GEORGE HAY, a subject of the King of England, residing at 104 Kings road, Prestwich, in the county of Lancaster, England, have invented new and useful Improvements in and Connected with Apparatus Employed in the Removal of Dust and the like, of which the following is a specification.

This invention has reference to apparatus or means connected with the removal or dealing with dust or dirt, or the like, such for instance as systems where dust, or dirt, or the like is removed by a vacuum or partial vacuum, created by suitable exhausting or vacuum producing means, and where the dust or dirt or the like is intercepted between its point of entering the apparatus— say at an intake or suction pipe or nozzle, and the air exhausting and moving means, by a filter or screen. And the primary object of this invention is to provide improvements in connection with this kind of dust or the like removing apparatus, by which the automatic or semi-automatic cleansing of the filter or screen medium, is accomplished, and the vessel or receiver in connection with which the filter or screen is used, can be wholly or nearly wholly filled with dust, instead of being only partly filled, as with present apparatus.

In this apparatus the filter or screen is movable, or has a movable part, which has connected with it a valve, and this valve operates in connection with the inlet of the air pipe from the interior or exhausting side of the filter or screen; and it is so arranged, that when the bag or screen becomes choked or sealed, the air pipe is closed by the valve by the degree of partial vacuum then existing in the screen and remains closed until a flow of air for cleaning purposes is allowed to enter the pipe in the opposite direction and which is controlled by a separate valve; this pressure causing a movement of the screen or a part of it, so moving the valve as to close the pipe. When the system is thus closed, the action in the collecting or intake pipe or nozzle will cease, and thereupon the operator will understand that the screen or bag is sealed, and the filter requires cleaning.

To clean the filter or screen, that is remove adhering dust from its surface, the inlet or entrance nozzle or trunk of the dust and air pipe is closed by placing a cap or the like, on it, or by shutting a tap, so that the degree of vacuum inside the receiver will rise; and under this condition, external air is then admitted into the interior of the screen or sieve, or filter, by a hand operated valve, and passes through the screening or filtering bag or medium in the opposite direction to the normal direction, removing from it and carrying with it the adhering dust which was choking or sealing it; and this alternate action of creating a vacuum within the vessel, and then admitting air to the interior or behind the screen being repeated several times, the inrushing air will remove the accumulated dust on the outside, and cleanse it.

The invention is illustrated in the annexed drawing which shows in section an apparatus comprising the improvements.

1 represents generally the dust and air receiver and dust collecting and discharging vessel, having a hopper shaped bottom portion 2 with a closing door 3 at its lower end; and a butter-fly valve 4 in the mouth 5; while at the upper end, there is a removable close fitting cover 6.

7 is the dust and air suction or intake conduit, having on its inner end a branch 8, adapted to deliver the air and dust tangentially into the upper part of the receiver.

10 is the filter or screen within the vessel 1; and 11 represents the air exhausting apparatus, which may be assumed to be a steam jet exhauster. The filter or screen 10 is in the form of a cylindrical bag of suitable textile material, having within it a spiral wire 12 which keeps it extended axially, and supports its cylindrical walls radially. The lower end of the filter 10 is closed by a conical end plate 13—say of thin metal; and the upper end may also be closed by a conical thin metal end 14; and this upper end portion is secured to a pipe 15 which extends down into the filter, and leads by a port 16 from the upper end of the filter to the outside of the vessel, and the exhausting apparatus 11. The screen 10 is held at its upper part 14, and is stationary, while below this point, it is movable vertically; and the valve referred to which is moved by this filter, is marked 17, and is carried by the lower end 13, and operates in connection with the lower end of the dependent pipe or conduit 15.

18 is the filter cleansing air inlet valve; and 19 is its hand operated rod.

In action, the partial vacuum created by the air exhausting apparatus, acting through the conduit 16, produces a vacuum in the whole interior of the apparatus and the pipe 7 being fed with air and dust in any known suitable way used in such apparatus of the kind concerned the dust carried by the air will pass into the interior of the receiver 1; and being, by the inlet branch 8, directed in a tangential manner into the vessel, the separation of the dust or the like from the air, and its fall down the annular space between the walls of the receiver of the filter, will be promoted. The air passes through the walls of the filter 10, which rids it of any remaining dust particles it contains; and it passes by the pipe 15 out of the apparatus. Normally the filter is held or extended vertically, that is longitudinally, by this spiral wire 12; but when the vacuum in it rises, due to the collection of dust on its surface, and the closing of its interstices or pores, the filter collapses axially; and thereby the valve 17 is moved up to the lower end of the mouth of the pipe 15, closing it, and compressing the spring 20 between it and the stop 21, on a rod 23, which extends down from the top of the pipe to and through the valve. And when this takes place, the intake action at the collecting or intake mouth of the device, connected with the pipe 7, will cease, and the operator will know that the screen 10 is choked and requires cleaning.

As above stated, the entrance to the pipe 7 is closed by putting a cap on the end of the intake nozzle or closing a tap on it, and thereby a partial vacuum will be created within the whole apparatus outside the filter; and in this condition, the valve 18 is opened by hand, by operating the rod 19, and thereby outside air will rush in, and pass from within the filter to the annular space outside it in the vessel 1 and so will carry from the filter's external surface and pores, the dust adhering to it and contained in it; and if this operation is repeated several times by the closing and opening of the valve 18, the complete cleansing of the filter will take place.

When the filter is clean, the spring 20 will force the valve 17 away from the pipe 15, and the filter will be extended to its normal position, as shown in the drawing.

The close fitting door 3, at the neck 5 of the hopper 2 is held in position by a lever 26, to which it is connected and a hand nut 27, screwed on to the rod 28; and the butterfly valve 4 whose normal position is that shown in the figure, is operated by a lever 29.

When the receiver 1 has collected a certain quantity of dust, and it is required to remove it, say into a bag, the door 3 is opened and swung out of the way, and the bag fitted over the neck 5; and then the valve 29 is turned around so as to open the neck, the contents fall into the bag.

The whole apparatus may be supported from the ground at the required distance by legs 30.

What is claimed is:—

1. In a vacuum apparatus for the removal of or dealing with dust or dirt, the combination with a closed vessel, of a filter within the said vessel, a part of the said filter movable, a conduit for introducing air into the vessel, a discharging conduit communicating with the filter for drawing the air through the filter and thereby exhausting the vessel, a closure means within the discharging conduit connected with and adapted to be operated by the movable part of the filter, and means for admitting air directly from the atmosphere into the interior of the filter, whereby the dust on the exterior walls thereof is removed.

2. In a vacuum apparatus for the removal of or dealing with dust or dirt, the combination with a closed vessel of a collapsible filter within the said vessel, means for supporting the filter against radial pressure, the said filter being movable axially, an intake conduit for introducing air and dust into the vessel, a discharging conduit in communication with the filter for exhausting the air in the vessel, a closure means in the discharge conduit connected with and operated by the axial movement of the filter, and means for introducing air to the interior of the filter whereby the dust on the exterior walls thereof is removed, substantially as described.

3. In a vacuum apparatus for the removal of or dealing with dust or dirt, the combination with a closed vessel, of a collapsible filter within the said vessel, resilient means for supporting the walls of the filter against radial pressure, the said filter being movable axially, an intake conduit for introducing air and dust into the vessel and outside of the filter, a discharge conduit in communication with the interior of the filter for discharging the air in the vessel, a valve in the discharge conduit connected with and operated by the axial movement of the filter, and an atmospheric inlet valve for communication with the interior of the filter, the parts arranged as and for the purpose described.

In testimony whereof I have signed my name to this specification in the presence of two subscribing witnesses.

WILLIAM GEORGE HAY.

Witnesses:
SOMERVILLE GOODALL,
ROBERT WITTER.